United States Patent [19]

Pleva et al.

[11] Patent Number: 4,991,085
[45] Date of Patent: Feb. 5, 1991

[54] PERSONAL COMPUTER BUS INTERFACE CHIP WITH MULTI-FUNCTION ADDRESS RELOCATION PINS

[75] Inventors: Robert M. Pleva, Livermore; Robert W. Catlin, Santa Clara, both of Calif.

[73] Assignee: Chips and Technologies, Inc., San Jose, Calif.

[21] Appl. No.: 181,138

[22] Filed: Apr. 13, 1988

[51] Int. Cl.$^5$ .................... G06F 13/12; G06F 13/14; G06F 13/42
[52] U.S. Cl. .................. 364/200; 364/239.9; 364/240
[58] Field of Search ... 364/200 MS File, 900 MS File; 370/85

[56] References Cited

U.S. PATENT DOCUMENTS

| | | | |
|---|---|---|---|
| 4,218,740 | 8/1980 | Bennett et al. | 364/200 |
| 4,396,995 | 8/1983 | Grau | 364/900 |
| 4,453,211 | 6/1984 | Askinazi et al. | 364/200 |
| 4,453,229 | 6/1984 | Schaire | 364/900 |
| 4,580,213 | 4/1986 | Hulett et al. | 364/200 |
| 4,602,327 | 7/1986 | LaViolette et al. | 364/200 |
| 4,721,868 | 1/1988 | Cornell et al. | 307/465 |
| 4,727,477 | 2/1988 | Gavril | 364/200 |

OTHER PUBLICATIONS

Altera Data Sheet, Altera Corporation, Santa Clara, Calif. 95051.
IBM Hardware Interface Technical Reference Manual.
Electronics Magazine Article, Oct. 15, 1987.
82C611, 82C612 Preliminary Data Sheet of Chips, 1/88, Rev. O.
Microprocessor Report Newsletter: C&T MicroCHIPs Simplify Micro Channel Interfacing, Reprinted from the Jan. 1988 issue.

Primary Examiner—David Y. Eng

[57] ABSTRACT

An integrated circuit chip that facilitates connecting peripheral devices to an MCA Micro Channel Architecture bus system. With the present invention manufacturers of adapter boards and cards can easily interface peripheral devices to an MCA bus. With the present invention the MCA interface is segmented in a different manner than it is segmented in prior art adapters. In the approach utilized with the present invention the interface has been partitioned so that the microchannel signals and the protocol signals common to all functions are contained on an interface chip. The present interface integrated chip combines (a) command decode circuitry for receiving coded signals from the MCA bus and for generating decoded command signals for peripheral devices (b) pin control circuitry which controls multi-function pins (c) bus arbitration control circuitry, (d) POS Programmable Option Select register control circuitry to facilitate adapter identification support, (e) ready logic circuitry to facilitate synchronous ready signal generation, (f) circuitry to facilitate device error reporting, (g) external data buffer control, (h) bus response signal generation circuitry, and (j) circuitry to support memory and I-O relocation. The above combination of functions is provided on a single integrated circuit thereby efficiently utilizing the limited number of I-O pins available on the integrated circuit.

5 Claims, 5 Drawing Sheets

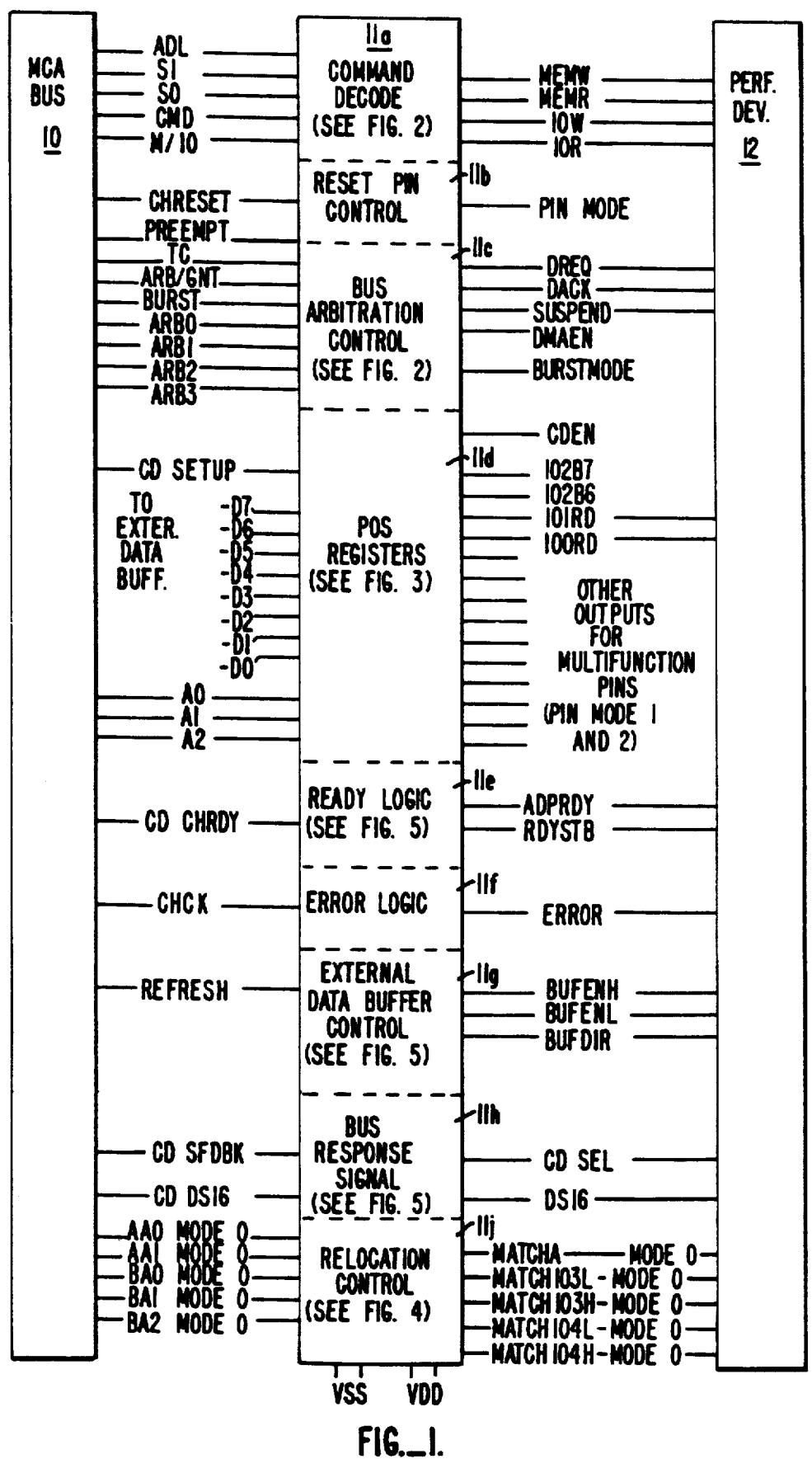
FIG._1.

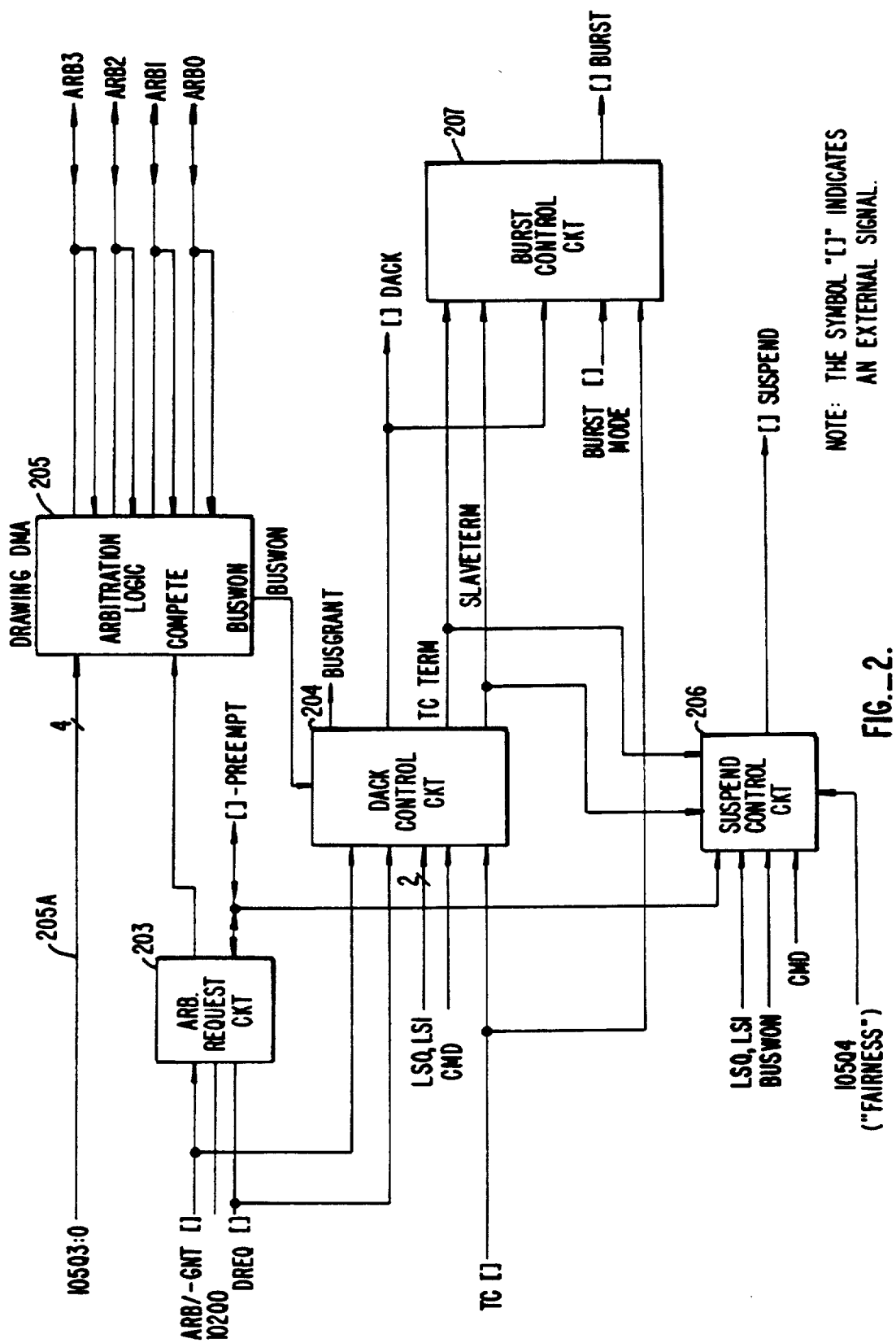
FIG._2.

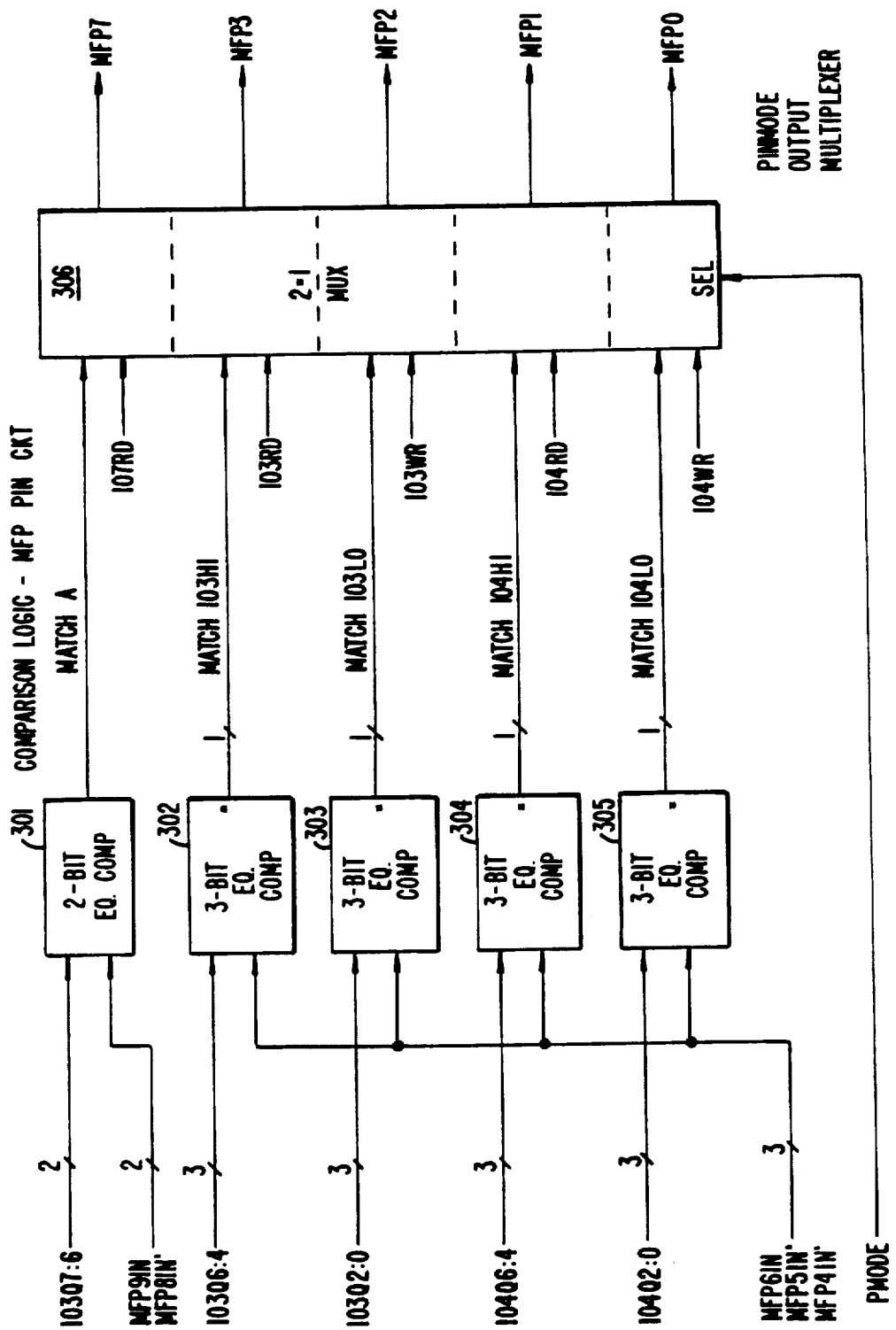
FIG._3.

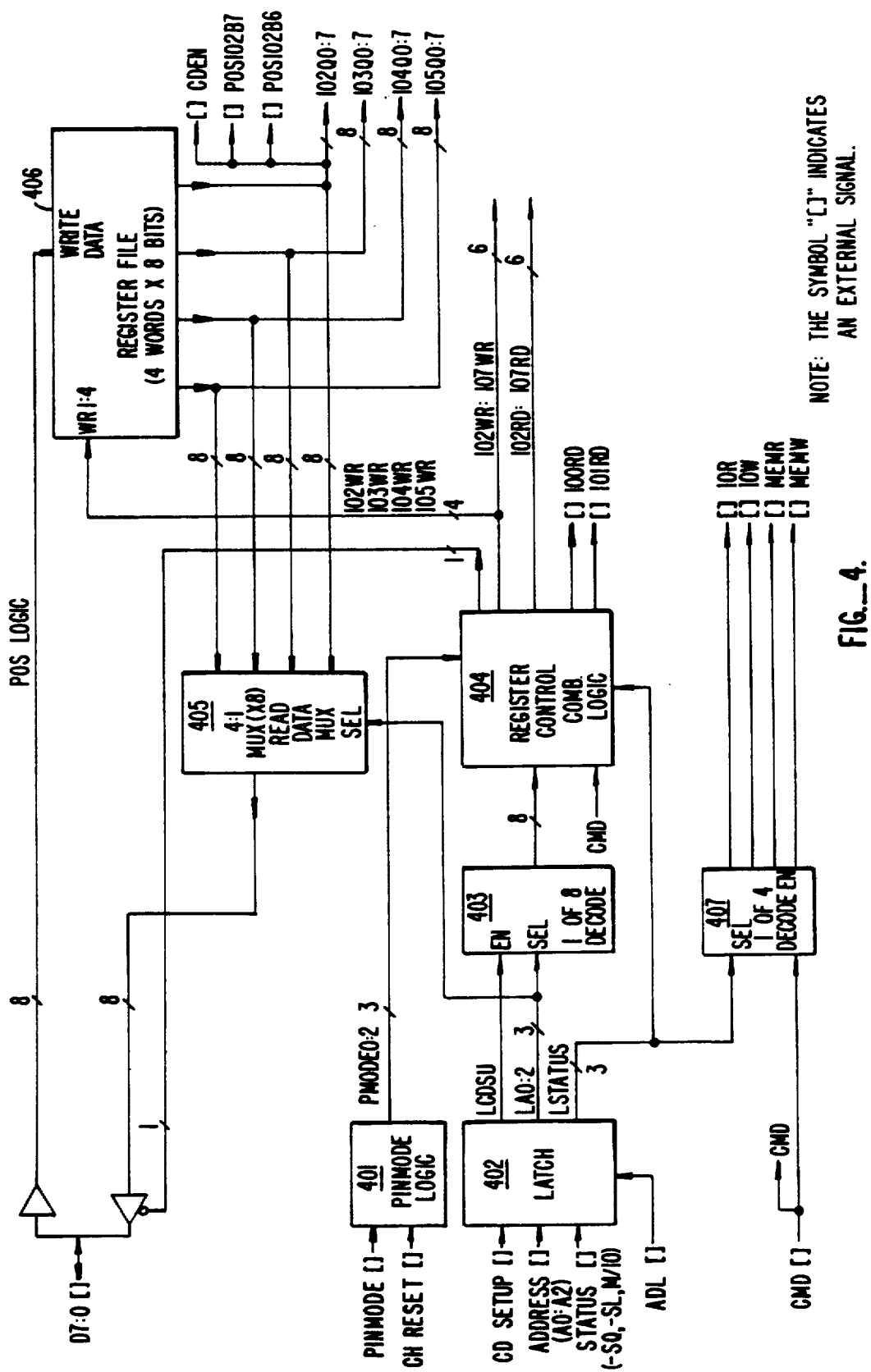
FIG._4.

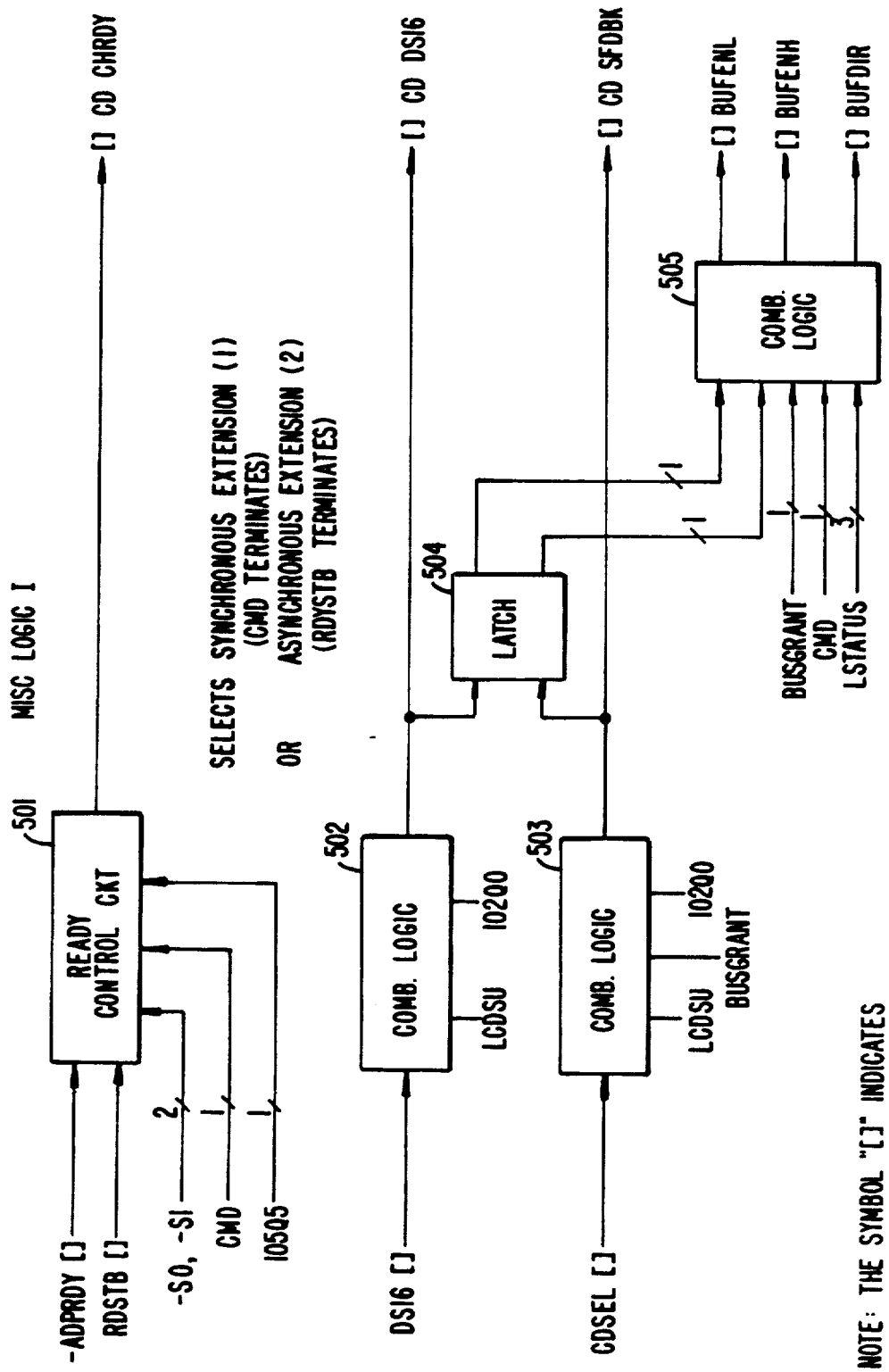
FIG._5.

PERSONAL COMPUTER BUS INTERFACE CHIP WITH MULTI-FUNCTION ADDRESS RELOCATION PINS

FIELD OF THE INVENTION

The present invention relates to personal computers and more particularly to adaptor cards that connect to the channel of a personal computer

BACKGROUND OF THE INVENTION

The IBM personal computer family has become a widely accepted defacto standard for a particular class of personal computers. The IBM personal computer systems known as the PC, XT, and AT systems have a relatively simple I/O bus whereas the IBM PS/2 systems have a relatively complicated asynchronous bus system termed the "Microchannel" bus. IBM has published specifications for the IBM Microchannel. Among other places the Microchannel is described in the IBM Technical References Manual for the PS/2 Models 50/60. This manual is commercially available from the IBM Corporation, Armonk, N.Y. Another reference document is the IBM Personal System/2 Seminar Proceedings, Volume 5, Number 3 dated May 1987.

The IBM Microchannel bus has been widely discussed in the literature and many computers which are compatible with the IBM PS/2 series of computers require a channel structure which is functionally compatible to the IBM Microchannel. The architecture used in the IBM Microchannel has generally become known as the MCA architecture.

In general, an asynchronous MCA bus system is more complicated than the bus systems used on previous personal computers such as PC, XT and AT computer systems; however, asynchronous bus systems such as the MCA bus system have certain advantages.

An important feature of the MCA technology is that MCA systems use coded cycle commands in contrast to the uncoded memory I-O signals used on the synchronous AT bus system. Many peripheral devices for personal computers require uncoded command signals and hence in order to connect such devices to an MCA bus, logic must be provided to decode the bus status signals to provide the commands used by the peripherals.

Another distinction between the MCA bus systems and the bus systems used in the PC, XT and AT families is that the PC, XT and AT families generally utilized DIP switches and jumper cables to select various features, whereas, MCA bus systems includes a programmable option select (POS) feature which is implemented by means of a number of registers for each card slot. There may be up to eight POS registers and each register has eight bits. Each adapter card designed for an MCA bus must contain some or all of the POS registers. The system board can select each card slot independently by generating a slot specific signal.

In systems with an MCA bus, the system board reads and writes POS register using a script language driven by an adapter description file (ADF). There is a different ADF for each type of adapter card. The system board must be able to tell what card type is installed in each slot, therefore, the MCA bus uses POS registers to return a sixteen bit adapter ID.

In addition to the POS register or registers which identify the adapter card, MCA architecture also defines other POS registers. In general these other POS registers fall into two categories: free form registers which do not have a specific assigned function and registers whose function is fixed depending upon the particular application being implemented.

Much detailed information about the structure of MCA bus systems is available in literature provided by IBM and by other publishers.

SUMMARY OF THE INVENTION

The present invention provides an integrated circuit chip that facilitates connecting peripheral devices to an MCA bus system. With the present invention manufacturers of adapter boards and cards can easily interface peripheral devices to an MCA bus. Furthermore with the present invention peripheral devices which were designed for PC, XT or AT systems can easily be connected to an MCA bus.

With the present invention the MCA interface is segmented in a different manner than it is segmented in prior art adapters. The prior art interface cards mix the circuitry for handling generic hand shaking signals and bus protocols with the circuitry needed to implement a specific function. In the approach utilized with the present invention the interface has been partitioned so that the microchannel signals and the protocol signals common to all functions are contained on an interface chip.

The present interface integrated chip combines (a) command decode circuitry for receiving coded signals from the MCA bus and for generating decoded cvommand signals for the peripheral devices, (b) pin control circuitry which controls multifunction pins (c) bus arbitration control circuitry, (d) POS register control circuitry to facilitate adapter identification support , (e) ready logic circuitry to facilitate synchronous ready signal generation, (f) circuitry to facilitate device error reporting, (g) external data buffer control, (h) bus response signal generation circuitry, and (j) circuitry to support memory and I-O relocation. The above combination of functions is provided on a single integrated circuit thereby efficiently utilizing the limited number of I-O pins available on the integrated circuit.

The present invention also includes circuitry to generate some special signals such a SUSPEND signal. The SUSPEND signal indicates to a peripheral device that the device has a specified amount of time to complete an operation. The SUSPEND signal is not one of the signals defined on an MCA bus. It has been found that provision of a SUSPEND signal significantly facilitates connectiong peripheral devices to an MCA bus.

DESCRIPTION OF DRAWINGS

FIG. 1 is an overall system diagram.

FIG. 2 is a logical block diagram of the bus arbitration and DMA support circuitry.

FIG. 3 is a logical block diagram of the relocation control circuitry.

FIG. 4 is a logical block diagram of the Command Decode and POS register circuitry.

FIG. 5 is a logical block diagram of the ready logic, the external data buffer control and the bus response logic.

DETAILED DESCRIPTION

An overall illustration of an embodiment of the present invention is shown in FIG. 1. Detailed logic for implementing circuit 11 shown in FIG. 1 is shown in FIG. 2, 3, 4 and 5. As shown in FIG. 1 circuit 11 provides a simplified connection between MCA bus 10 and peripheral device 12. Circuit 11 and peripheral device 12 would generally be mounted on an adapter card or board (not specifcally shown) which is designed to plug into a standard connector on an MCA bus in a personal computer.

The present invention provides in a convenient and integrated fashion the interface logic 11 required on adapter cards which are designed to interface to an MCA bus. The present invention provides many benefits to designers of add-in adapters for the MCA bus systems including:

(a) Space savings because of the single chip VLSI approach,
(b) cost savings because of the integration of many components into one,
(c) time savings because of the ease of design,
(d) efficient utilization of the limited pins available on a single integrated circuit.

The present invention can be used in two ways. First, the invention can be used to interface existing PC, XT or AT peripheral devices to an MCA bus. Existing PC, XT or AT peripheral devices generally require decoded command signals whereas an MCA bus requires coded signals. The present invention can be used to facilitate interfacing peripheral devices that require decoded command signals to an MCA bus.

The second way that the present invention can be used is to facilitate the connection of new devices to an MCA bus. The invention can be embodied in one 68-pin PLCC (plastic leadless chip carrier) thereby significantly reducing the number of separate circuits required on an adapter card.

The sixty eight pins on the module are designated as follows:

| Pin | Designation | Pin | Designation |
|---|---|---|---|
| 1. | VSS | 35. | VSS |
| 2. | DACK | 36. | −BUFENL |
| 3. | −DMAEN | 37. | BUFDIR |
| 4. | −BURST | 38. | CDEN |
| 5. | −IOR | 39. | POS102B6 |
| 6. | −IOW | 40. | POS102B7 |
| 7. | −MEMR | 41. | CD CHRDY |
| 8. | −MEMW | 42. | −ADPRDY |
| 9. | ARB0 | 43. | +RDYSTB |
| 10. | ARB1 | 44. | −CMD |
| 11. | PINMODE | 45. | −S0 |
| 12. | CHRESET | 46. | −S1 |
| 13. | MFP0 | 47. | −ADL |
| 14. | MFP1 | 48. | D0 |
| 15. | MFP2 | 49. | D1 |
| 16. | MFP3 | 50. | D2 |
| 17. | MFP4 | 51. | D3 |
| 18. | VDD | 52. | VDD |
| 19. | MFP5 | 53. | D4 |
| 20. | MFP6 | 54. | D5 |
| 21. | MFP7 | 55. | D6 |
| 22. | MFP8 | 56. | D7 |
| 23. | MFP9 | 57. | A0 |
| 24. | M/−IO | 58. | A1 |
| 25. | −ERROR | 59. | A2 |
| 26. | −CD SETUP | 60. | ARB2 |
| 27. | −PREEMPT | 61. | ARB3 |
| 28. | −CD SEL | 62. | −100RD |
| 29. | −REFRESH | 63. | −101RD |
| 30. | −CD SFDBK | 64. | −BURSTMODE |
| 31. | −CD DS16 | 65. | ARB/−GNT |
| 32. | −DS16 | 66. | −DREQ |
| 33. | −CHCK | 67. | −TC |
| 34. | −BUFENH | 68. | SUSPEND |

The above signals appear in FIG. 1 to 5 with the above designations. In addition in FIGS. 2 to 5 the symbol [ ] is used to designate pins with these external signals. Signals that are internal to the circuit are merely shown by lines with arrows. As shown in FIG. 1 the interface circuit 11 includes nine sections namely:

| Section | Function |
|---|---|
| 11a | Command Decode circuitry |
| 11b | Reset/Pin Control circuitry |
| 11c | Bus arbitration control circuitry |
| 11d | POS Register circuitry |
| 11e | Ready logic control circuitry |
| 11f | Error logic control circuitry |
| 11g | External data buffer control |
| 11h | Bus Response Signal Circuitry |
| 11j | Relocation Control Circuitry |

The above sections perform the following functions:

Command Decode 11a: Decodes the MCA status signals and command signals and turns them into traditional memory read, memory write, I-O read and I-O write signals.

Reset and Pin Control 11b: Receives reset and pin mode signals for the circuit.

Bus Arbitration Control 11c: Generates and receives MCA arbitration signals when requested by the signals from the peripheral device.

POS Registers 11d: Implements required POS registers appropriate to the selected pin mode and provides decoded select signals for driving the identification byte on the MCA bus.

Ready Logic 11e: Takes synchronous or asynchronous signals from the peripheral device and generates appropriate cycle timing for the CH CHRDY on the MCA bus.

Error Logic 11f: Generated MCA bus compatible check signal from adapter error flag signal. This is reflected in the POS registers.

External Data Buffer Control 11g: Provides enable and direction signals to external data buffers.

Bus Response Signal 11h: Generates card select and data size signals which go to the MCA bus.

Relocation Control 11j: Aids in generating signals directed by system software for address relocation.

The circuit 11 provides a direct interface to the bus command and status signals, and decodes them into a set of general purpose signals for use by the adapter logic 12. The signals provided to peripheral device 12 include memory read and write strobes, I/O read and write strobes, and data buffer control lines. The signals supplied to circuit 12 resemble XT/AT bus signals in order to facilitate adapting existing designs from those buses to the MCA bus.

The circuit 11 also provides support for the Programmable Option Select (POS) system implemented on the MCA bus. The POS system consists of up to eight registers located on each adapter card. These registers are used to set board parameters such as addressing, interrupt level and to read the board's ID. The POS system is intended to eliminate jumpers and switches on the adapter card. This means that board resources are redefinable through the POS registers.

The circuit 11 fully decodes these registers and provides varying amount of relocation support depending on a strapping option. Ten multi-function pins are used to support relocation. Their functions vary depending on the strapping option.

The circuit 11 can be used on DMA Slave cards. A DMA slave is one which uses the DMA controller in the system to generate bus data transfer cycles, status information and strobes. In addition to the features described above, the circuit provides full support for DMA arbitration and handshaking. The arbitration level is programmable through the POS system. The circuit supports both single-cycle and burst modes of operation. In burst mode, it supports the fairness algorithm as defined by IBM. Fairness is also programmable.

The major functions provided by the circuit 11 will now be described:

MCA Bus interface: The circuit provide a complete interface to the MCA bus. Since the chips meet the timing and bus drive specifications, most lines (with the exception of the data bus) connect directly to the MCA bus pins. The designer does not need to do anything special with these lines, he merely needs to connect them. The exact function of these signals is described in the IBM Technical Reference manual previously described.

I/O and Memory read and Write Strobes: The circuit provides four strobes—one each for memory reads and writes and I/O reads and writes. They are based on a decode of the status and the −CMD line from the MCA bus and are active for all bus cycles.

Data Bus Buffer Control Signals: The circuit provides two enable signals and one direction signal for controlling external data buffers on the adapter. These buffers are used to isolate the adapter logic and the circuit from the MCA bus data bus. These buffers can be implemented with transceivers. Only one transceiver is required for an adapter that only supports 8 bits transfers. The −BUFENL signal enables the low order data transceiver and the −BUFENH signal enables the high order data transceiver (if required). BUFDIR is connected to the direction control of the transceivers, and the "A" bus of the transceiver is connected to the MCA bus data bus with the "B" bus connected to the internal adapter data bus.

Ready Signals: If the adapter design needs more time to transfer data on the MCA bus, it can request that the cycle be extended. This is commonly known as a wait state, but on the MCA bus it is called an extended cycle.

The MCA bus supports two types of "extended" cycles:

Asynchronous Extended and Synchronous Extended. The difference between the two is the timing of the CD CHRDY. In the asynchronous case, CD CHRDY is removed by the adapter at any time. In the synchronous case CD CHRDY is removed synchronously within 30 nanoseconds of the falling edge of −CMD. The synchronous extended cycle will consist of one wait state. The asynchronous extended cycle may consist of one or more wait states. The circuit supports both types of extended cycles through a bit programmed during POS (POS register 105, bit 5).

The circuit causes an extended cycle when the −ADPRDY signal is pulled low by the adapter logic. This is caused by an unlatched decode of the address referencing that portion of the adapter circuitry that is slow. For an asynchronous extended cycle (Register 105, bit 5 low) a rising edge on the +RDYSTB line removes CD CHRDY causing the extended cycle to complete. For a synchronous extended cycle, CD CHRDY is removed by the circuit immediately following the falling edge of −CMD. Therefore the +RDYSTB signal need not be used and may be tied low.

Data Size: The −DS16 input to the circuit is used to tell the MCA bus what data path size this card (or card section) is capable of handling. It is also used by the circuit to properly control the data bus buffers. If this is an 8 bit or 16 bit only card, this signal should be tied high or low respectively. If different sections of this board support different transfer sizes (for example a multi-function card with 8 bit I/O and 16 bit memory) then this line should be switched depending on which section of the board is addressed. It should be based on a decode of the unlatched addresses.

Card Select and Card Enable: The −CD SEL line is the card select input to the circuit. It should go low when this adapter is selected. It should be based on an unlatched address decode. For cards with both memory and I/O address spaces, this signal must be a composite of all of the address decodes. If the relocation functions of the circuit are being used, the "match" outputs must be part of the external decode—they are not combined internally with −CD SEL.

The POS system must have the ability to turn off or disable a non-functioning card, or one whose address conflicts cannot be resolved. It does this by setting or resetting the card enabled bit (POS register 2, bit 0). The state of this bit is brought out of the circuit on the CDEN line. When high, the card is enabled. This signal should qualify the address decoders for the card.

Error Condition Reporting: When the adapter logic detects an error condition like a memory parity error), it pulls the −ERROR line low. This will cause the −CHCK line to be asserted on the MCA bus. The fact that an error occurred is latched inside the circuit and can be read as bit 7 of POS register 105.

Multi Function Pins: Multi-Function Pins: This set of 10 pins are used to support relocation and other POS operations.

DMA Support: The circuit fully supports DMA slave operations. It contains the bus arbitration logic and DMA handshaking signals. The adapter functions have been designed to resemble the signals on the XT/AT bus.

POS Support: The POS (programmable option select) register allow the system microprocessor to poll each card and determine its characteristics, as well as write configuration data to it. Ideally, all card resources should be relocatable through this mechanism so that addressing conflicts between cards can be eliminated without the need for jumpers or switches. In addition, each card type is required to have a unique card ID so that the POS system knows how to configure it. The following paragraphs describe how the circuit supports the POS.

POS Mechanism: Each connector in an MCA bus system has a unique signal called −CD SETUP, that when active low, puts a card resident in that slot into the setup mode. During the POST (power-on self test) the system microprocessor puts each slot in turn into the set-up mode, reads its ID, and sends it configuration data. During set-up, each card has a set of registers that appear at I/O address 100 to 107H (called the POS registers). Since only one card at a time is in set-up mode, no address conflicts occur. The circuit also handles all of the mechanisms required by the POS system, such as set-up mode decoding and driving/not driving the proper signals. In addition to saving valuable board real estate, it allows the designer to concentrate on other aspects of the adapter design.

Card ID: With respect to cards made to connect to an MCA bus, each adapter type from a manufacturer must have unique card ID. This is a 16 bit value. Adapter IDs are generally chosen according to the following table:

| ID | Definition |
|---|---|
| 0000 | Device not ready |
| 0001 to OFFF | Bus Master |
| 5000 to 5FFF | Direct Memory Access Devices |
| 6000 to 6FFF | Direct Program Control (including memory-mapped I/O) |
| 7000 to 7FFF | Storage (multiple-function adapters containing storage typically respond as storage) |
| 8000 to 8FFF | Video |
| FFFF | Device not attached. |

The ID bytes are accessed in POS registers 100 and 101, with the least significant byte corresponding to register 100, the circuit provides two read strobes, −100RD and −101RD that are used to gate the ID bytes onto the data bus. The ID may be held in a PROM or other programmable logic device, or be hardwired and implemented with three-state or open collector drivers. The PROM solution offers the most flexibility as any ID may be programmed and the "device not ready" ID of 0000H is also easily implemented. The 3-state solution may offer the lowest cost at the expense of limited ID choices.

Register 102: Only Bit 0 of register 102 has a defined function in the general MCA specification. It is the Card Enable bit. Writing a 0 to this bit disables the card. Conversely, writing a 1 to this bit enables the card. Typically, this is handled by the POS configuration routines. When this bit is 0, none of the "normal mode" signals are generated by the circuit. The state of this bit is available to the adapter logic as the signal CDEN. When CDEN is high, the card is enabled. This bit and CDEN are reset to 0 on a CHRESET. The remaining bits of register 102 are user-defined. Bits 6 and 7 are available externally for use by the card designer. They are available on 102BIT6 and 102BIT7. They are both reset to 0 on CHRESET.

Register 103: In pin modes 0 and 1, register 103 is implemented internal to the circuit. These two modes are used to support relocation. In pin mode 2, register 103 is implemented external to the circuit and may be used for any function the designer wishes.

Register 104: In pin mode 0, register 104 is implemented internal to the circuit and is used to support relocation. In pin modes 1 and 2, register 104 is implemented external to the circuit and may be used for whatever function the designer wishes.

Register 105: Register 105 is always internal to the circuit. Bit 5 is the SYNC READY bit. When high, it tells the circuit to remove CD CHRDY synchronously with the leading edge of the −CMD signal. This causes the system to perform a "synchronous extended" transfer. When low, CD CHRDY will be removed asynchronously. Bit 6 is the −STAT AVAIL bit. This read-only bit may be provided by the adapter logic when it signals an error condition. When low, this bit signals the system that the adapter has additional status information available at POS registers 106 and/or 107. Note that this bit and function are only available when the circuit is operating in pin mode 2. In other modes, this bit always reads 0. For more explanation, see the Pin Modes section of the data sheet. Bit 7 is the −CHCK ACTIVE bit. When low it indicates that the adapter logic has signalled an error condition via the −ERROR input. This bit is set to one upon reset. For more information, see the −ERROR pin description. The remaining bits of register 105 are used for DMA operations. Bits 0 through 3 represent the arbitration level for this adapter. These bits are normally set by the POS system. Bit 4 is the FAIRNESS bit. When set low, this bit enables the fairness algorithm. This prevents high priority arbiters from excluding lower priority arbiters.

Registers 106 and 107: Registers 106 and 107 are implemented external to circuit. Read and write strobes are available for these registers in pin mode 2.

Pin Modes: Three pin modes are available on the circuit. They are selected by strapping the PINMODE input to Vss for pin mode 0, Vdd for pin mode 1 or CHRESET for pin mode 2.

Pin Mode 0: This mode provides the most amount of support for POS controlled relocation of the adapter resources. The functions of the pins in Mode 0 are described below:

| MFP9: | I | AA1 |
|---|---|---|
| MFP8: | I | AA0 |
| MFP7: | O | −MATCH A |
| MFP6: | I | BA2 |
| MFP5: | I | BA1 |
| MFP4: | I | BA0 |
| MFP3: | O | −MATCH 103HI |
| MFP2: | O | −MATCH 103LO |
| MFP1: | O | −MATCH 104HI |
| MFP0: | O | −MATCH 104LO |

Two address fields (AA1:0 and BA2:0) are provided to input external address bits. The AA bits are continually compared with POS register 103 bits 7 and 6. The result of the compare is output on the −MATCH A pin, with a low signifying a match. Similarly, the BA bits are continuously compared to four different register fields: Bits 5:3 and bits 2:0 of both POS registers 103 and 104. The results of the comparisons are output as follows: A match between BA2:0 and POS register 103 bits 5:3 is signified by a low on −MATCH 103HI. A match 2 between BA2:0 and POS register 103 bits 2:0 is signified by a low on −MATCH 103LO. A match between BA2:0 and POS register 104 bits 5:3 is signified by a low on −MATCH 104HI. A match between BA2:0 and POS register 104 bits 2:0 is signified by a low on −MATCH 104LO.

The address inputs may be tied to any address lines depending on the size of the block being decoded, for example, if a 1 megabyte memory block was desired to be relocated at any of the first four 1 megabyte boundaries, one would tie A20 and A21 to AA1:0. By writing the proper bit pattern to POS register 103 in bits 6 and 7, the block could be relocated on one of four possible 1 megabyte boundaries (in the first four megabytes). The BA lines could be used on the same board to specify relocation address for I/O ports. This would allow four different blocks of I/O ports to be relocated to any of eight possible address locations in the range reflected in the choice of address bits for BA2:0. Of course, additional logic would be required externally to further qualify and decode these addresses.

Note that if these Match outputs are intended to remain stable throughout the cycle, they, or the address lines that generate them, must be latched externally. The AA and BA lines are not latched internally.

Pin Mode 1: This pin mode is very similar to pin mode 0, except that only register 103 is used to support relocation internally. This means that only two blocks are decoded from the BA lines. The AA lines work as in pin mode 0. Instead of using register 104 internally, the active low read and write strobes are brought out as 104RD and 104WR. The designer may implement register 104 external to the circuit. The functions of the pins in pin mode 1 are described below.

| MFP9: | I | AA1 |
|---|---|---|
| MFP8: | I | AA0 |
| MFP7: | O | −MATCH A |
| MFP6: | I | BA2 |
| MFP5: | I | BA1 |
| MFP4: | I | BA0 |
| MFP3: | O | −MATCH 103HI |
| MFP2: | O | −MATCH 103LO |
| MFP1: | O | −104RD |
| MFP0: | O | −104WR |

Pin Mode 2: In this mode, no relocation support is provided internally. Instead, active low read and write strobes for POS registers 103, 104, 106 and 107 are brought out so that the designer may implement these registers external to the circuit.

| MFP9: | I | −STAT AVAIL |
|---|---|---|
| MFP8: | O | −BADL |
| MFP7: | O | −107RD |
| MFP6: | O | −107WR |
| MFP5: | O | −106RD |
| MFP4: | O | −106WR |
| MFP3: | O | −103RD |
| MFP2: | O | −103WR |
| MFP1: | O | −104RD |
| MFP0: | O | −104WR |

The −STAT AVAIL input may be provided by the card adapter logic when it signals an error condition. When the system reads this bit as a logic 0 (in POS register 105 bit 6) it indicates that the card will have additional status information available in POS registers 106 and 107. Note that this mode of operation is only available when the circuit is operating in pin mode 2. Otherwise this bit will always be read as a 0.

The +BADL is a buffered and inverted version of the −ADL pin on the MCA bus.

DMA Operations: The circuit has complete support for DMA transfers on the MCA bus. It handles DMA arbitration, single cycle and burst modes, and supports the fairness algorithm as defined by IBM. Note that the circuit is not intended for a "Bus Master" application. It is intended for DMA slave application—the difference primarily is that the DMA controller on the system board still provides address, status and command signals to the bus.

DMA Arbitration: A DMA slave requests the use of the MCA bus by activating the −PREEMPT line. The Central Arbitration Control Point (CACP) then raises the ARB/−GNT line signifying the start of an arbitration interval. During this time, the DMA slave drives its arbitration level onto the 4 ARB pins. There are 16 possible levels, with 0000H having the highest priority.

If any other device also requested the bus, it or they also assert their priority level on the ARB pins. Each competing device compares the levels it is driving on the pins with the levels already on the pins. If the device's priority level is higher than what is on the bus, that device is declared the winner. If the device sees a higher priority level on the bus than it is trying to assert, then it is declared a loser. The result is that the higher priority level will remain on the bus.

At the end of the arbitration cycle (signified by the CACP dropping the ARB/−GNT line) each device that participated in the arbitration will know if it won or lost the bus. If the device won, it raises the −PREEMPT line.

Single Cycle and Burst Mode Transfers: In a single-cycle transfer, the device completes a transfer and the CACP will raise ARB/−GNT again. In a burst transfer, the circuit would have activated the −BURST line along with −PREEMPT. If it won the bus, it would continue to assert −BURST until it was done transferring. It signifies the end of transfer by raising the −BURST line.

During burst transfers, other devices may request the use of the burst by asserting −PREEMPT. The device that currently owns the bus must release it within 7.5 microseconds by raising the −BURST line. The device relinquishing the bus is allowed to compete for it again. If it still has the higher priority, it will win the bus back, only having been off the bus during the arbitration interval.

Fairness: One can see that a high priority device could lock out all other devices if it wished. Therefore, MCA slave adapters have a "fairness" mode. If a device is "fair" it will not compete for the bus again until all requesters who were also competing for the bus have gotten a chance to run their cycles. If everyone is being fair then all devices that were competing will get the bus in order of their priority.

DMA Cycle Termination: The MCA bus has a bus line named −TC for Terminal Count. A low pulse on this pin signifies that the number of transfers programmed into the DMA controller has been reached. A DMA slave can use this signal to terminate the transfer and/or cause an interrupt to the CPU. If this was a burst transfer, the DMA slave must raise −BURST in response to a −TC. This is known as "DMA Controller Terminated". A DMA slave can also raise −BURST on its own. This is known as "DMA Slave Terminated".

Priority Levels: The priority levels are shown below:

| Priority Level | Used For |
|---|---|
| −2 | Memory Refresh |
| −1 | Error Recovery |
| 0 | DMA Port 0* |
| 1 | DMA Port 1 |
| 2 | DMA Port 2 |
| 3 | DMA Port 3 |
| 4 | DMA Port 4* |
| 5 | DMA Port 5 |
| 6 | DMA Port 6 |
| 7 | DMA Port 7 |
| 8 | SPARE |
| 9 | SPARE |
| A | SPARE |
| B | SPARE |
| C | SPARE |
| D | SPARE |
| E | SPARE |
| F | System Processor |

DMA ports 0 and 4 may be reassigned to respond to any priority level. For example, DMA port 0 could be reassigned to respond to level B, and a Bus Master could then be assigned to level 0.

Level −2 is reserved for memory refresh operations. Level −1 is used by the system processor when it absolutely needs to take control of the bus, such as during error recovery operations. These two "super-levels" have the highest priority. In fact, their levels never appear on the ARB pins. Thus, these two levels are guaranteed to win over anything on the bus.

The system processor normally has a priority level of F, or the lowest. Therefore, this level may not be used by a DMA slave.

So, out of 18 levels, only 15 are actually available to DMA slave cards.

DMA Adapter Logic Signals: The circuit has four signals that interface to the adapter logic. They are −DREQ, DACK, −BURST MODE and SUSPEND. The designer familiar with the XT/AT buses and/or the 8237 will recognize −DREQ and DACK. They work in essentially the same manner.

To initiate a transfer, the adapter logic drives −DREQ low. The circuit then handles all of the DMA arbitration functions on the bus. Once the adapter has won the arbitration, the circuit will respond with DACK going high.

For single cycle transfers, the adapter logic should raise −DREQ as soon as DACK goes high. For burst mode transfers, the adapter logic should first drive −BURST MODE and then −DREQ low. −BURST MODE will be latched internally by the leading edge of −DREQ. It must precede −DREQ by 15 nanoseconds. Transfers will start when DACK goes high. The logic should continue to assert −DREQ until one of the following events occur.

1. The adapter decides to terminate the cycle itself (DMA slave terminated), in which case it would raise the −DREQ line.

2. A −TC pulse occurs signifying the end of the transfer (DMA Controller terminated). The adapter logic should raise the −DREQ line.

3. The SUSPEND signal goes high, signifying that another device has requested the bus. Since the device does not have to relinquish the bus for 7.5 microseconds, the adapter logic can decide to do something intelligent in response to SUSPEND. It can decide to complete many more transfers and then relinquish the bus (as long as it does not violate the 7.5 microsecond limit), or it can give up the bus immediately. In the latter case, the adapter logic may simply gate −DREQ with SUSPEND.

As shown in FIG. 1, some of the signals connect the interface chip 11 to the MCA bus 10 and some of the pins connect the interface chip 11 to the peripheral device 12. The specific pins and their function is as follows: MCA Bus Pins The pins in this group connect directly to the pine of the same name on the MCA Bus. They meet all timing and drive specifications of the MCA bus so no external buffers are required. In the following description the type of pin is given as I or O for Input or output respectively and B for bi-directional.

| No. | Type | Symbol | Pin Description |
|---|---|---|---|
| 47 | I | −ADL | Address Decode Latch. This signal is used to latch address and status information from the MCA bus. It connects directly to the MCA bus −ADL pin |
| 24 | I | M/−IO | Memory/Input Output. This signal indicates whether a memory or I/O cycle is in progress. It connects directly to the MCA bus M/−IO pin. Its state is latched internally with −ADL. |
| 45 | I | −S0 | Status Bit 0. This signal, in conjunction with −M/IO and −S1, indicates the type of cycle that is in progress. It connects directly to the MCA bus −S0 pin. It is latched internally with −ADL. See table given below on how −M/IO, −S0 and −S1 are decoded. |
| 46 | I | −S1 | Status Bit 1. This signal, in conjunction with −M/IO and −S1, indicates the type of cycle that is in progress. It connects directly to the MCA bus −S1 pin. It is latched internally with −ADL. The M/IO, −S0 and −S1 are decoded as follows: |

| M/−IO | −S0 | −S1 | Function |
|---|---|---|---|
| 0 | 0 | 0 | Reserved A |
| 0 | 0 | 1 | I/O Write |
| 0 | 1 | 0 | I/O Read |
| 0 | 1 | 1 | Reserved B |
| 1 | 0 | 0 | Reserved C |
| 1 | 0 | 1 | Memory Write |
| 1 | 1 | 0 | Memory Read |
| 1 | 1 | 1 | Reserved D |

| No. | Type | Symbol | Pin Description |
|---|---|---|---|
| 44 | I | −CMD | Command. This signal is the generalized data strobe. It signifies when data is valid on the bus for write cycles, and when valid data should be placed on the bus for read cycles. It is used with the status information to generate internal and external read and write strobes. It connects directly to the MCA bus −CMD pin. |
| 30 | O | −CD SFDBK | Card Selected Feedback. Each memory or I/O slave card on the MCA bus drives this line low to indicate that it has been selected (address space decode is true). It is a function of the −CD SEL input. It is not driven during configuration (POS) or DMA cycles. This output is a standard totem-pole output. It connects directly to the MCA bus −CD SFDBK pin. |
| 31 | O | −CD DS16 | Card Data Size 16. This line is driven low to provide an indication that memory, I/O or DMA slave is capable of 16 bit data transfers. It is not driven by slaves that are only capable of 8 bit transfers. It is a function of the −DS16 input. This output is a standard totempole output. It connects directly to the MCA bus −CD DS16 pin. |
| 41 | O | CD CHRDY | Card Channel Ready. This line is used by a memory or I/O slave to indicate whether or not it is ready to complete the current bus cycle. It is normally held high (ready) and pulled low (not ready) to extend the current bus cycle. This line is generated as a function of the |

-continued

| No. | Type | Symbol | Pin Description |
|---|---|---|---|
| | | | -RDYSTB and -ADPRDY inputs. The circuit supports both the "asynchronous extended" and the "synchronous extended" ready modes through a programmable option bit. This output is a standard totem-pole output. It connects directly to the MCA bus CD CHRDY pin. |
| 59 | I | A2 | |
| 58 | I | A1 | |
| 57 | I | A0 | Address Bits 0 through 2. The three low order address lines from the bus. They are latched internally and used to select between the POS registers. They connect directly to the MCA bus A0, A1 and A2 pins. |
| 12 | I | CHRESET | Channel Reset. This line is asserted high to reset or initialize all adapters to their power-up state. All internal registers in the circuit are initialized on CHRESET. The mode of the multi-function pins are also established at CHRESET. This line connects directly to the MCA bus CHRESET pin. |
| 26 | I | -CD SETUP | Card Setup. This line is driven low to place the card in set-up mode. The system logic provides a separate -CD SETUP signal to each connector slot. While this line is low, the POS registers are accessed. The card's status and ID are read at this time and initialization bytes are written. When this line is high, the POS registers may no longer be accessed. This line connects directly to the MCA bus -CD SETUP pin. Circuitry for the function is not specifically shown in FIGS. 2 to 5. |
| 33 | O | -CHCK | Channel Check. This signal is used to indicate a serious error (such as a memory failure) on an adapter card. It is a function of the -ERROR input. This line is cleared when the circuit receives a CHRESET. It connects directly to MCA bus -CHCK pin. Circuitry for the function is not specifically shown in FIGS. 2 to 5. |

The following pins relate to DMA and bus ARBITRATION:

| | | | |
|---|---|---|---|
| 61 | B | ARB3 | |
| 60 | B | ARB2 | |
| 10 | B | ARB1 | |
| 9 | B | ARB0 | Arbitration Bus Priority Level. These lines are used by DMA slaves and Bus Masters to arbitrate for control of the bus. They represent and encoded priority level from 0 (highest priority) to F hex (lowest priority). The circuit monitors and drives these lines when competing for the bus. It provides an indication to the adapter logic (via the +DACK signal) that it has won the bus. These lines connect directly to the MCA bus ARB3:0 pins. |
| 65 | I | ARB/-GNT | Arbitrate/Grant. A rising edge on this line indicates the start of an arbitration interval, during which all adapters requesting control of the bus compete via the -ARB3:0 lines. The falling edge of this signal indicates the end of the arbitration interval and the grant of the bus to the winner. This line connects directly to MCA bus ARB/GNT pin |
| 27 | B | -PREEMPT | Preempt. This line is driven low by DMA slaves and Bus Masters to request the use of the bus. It must also be monitored by them in case another device also wants the bus. The circuit drives -PREEMPT low when the adapter logic requests a DMA transfer (via -DREQ). It will raise -PREEMPT after it detects that it has won the bus. It also monitors -PREEMPT while it has the bus and -BURSTMODE is active to signal the adapter logic (via SUSPEND) that another device has requested the bus. This pin connects directly to the MCA bus -PREEMPT pin. |
| 67 | I | -TC | Terminal Count. A low going pulse on this line indicates that the current DMA cycle is the last one of a series of transfers. Upon detection of a -TC pulse, the circuit will release DACK and -BURST at the end of the current DMA cycle. This line connects directly to the MCA bus -TC pin |
| 64 | I | -BURSTMODE | Burst Mode. This signal is driven low by the adapter logic to indicate that a "burst" DMA cycle is requested. The circuit will assert -BURST on the MCA bus when -DREQ is asserted and monitor -PREEMPT when -BURSTMODE is active |
| 66 | I | -DREQ | DMA Request. This signal is driven low by the adapter logic when a DMA transfer is requested. It causes the circuit to request the bus and compete in the arbitration cycle. For single cycle transfers, the adapter logic should raise -DREQ in response to the rising edge of DACK. For burst transfers, the adapter logic should raise -DREQ in response to a -TC pulse or the SUSPEND signal. |
| 2 | O | DACK | DMA Acknowledge. An active high signal from the circuit that indicates to the adapter logic that it has won the arbitration and has been granted the bus. DACK will bracket the entire DMA transfer. It will be dropped by the circuit when a -TC is detected or in response to -DREQ becoming inactive, at the end of the current DMA cycle. |
| 68 | O | SUSPEND | Suspend. An active high signal from the circuit that indicates to the adapter logic that another device has pre-empted a burst transfer currently in progress, and has not yet completed. |
| 3 | I | -DMAEN | DMA Enable. This signal should be tied low to enable the DMA functions of the circuit. Improper operation of the chip will result unless this pin is tied low. |

Adapter Logic Pins: The pins in this group, in addition to the Multi-Function Pins, provide the interface between the adapter logic circuits and the interface circuit. All of the following pins connect the circuit 11 to device 12.

| | | | |
|---|---|---|---|
| 7 | O | -MEMR | Memory Read. This signal is an active low memory read strobe. It is active for any memory read cycle. It is also active during -REFRESH |
| 8 | O | -MEMW | Memory Write. This signal is an active low memory write strobe. It is active for |

-continued

| | | | |
|---|---|---|---|
| 5 | O | −IOR | I/O Read. This signal is an active low I/O read strobe. It is active for any I/O read cycle. |
| 6 | O | −IOW | I/O Write. This signal is an active low I/O write strobe. It is active for any I/O write cycle. |
| 28 | I | −CD SEL | Card Select. The adapter logic drives this signal low to indicate that it has been addressed. It should be a composite select of both I/O and memory addresses if applicable. It must reflect unlatched addresses. The circuit latches this signal internally in order to generate stable strobes and enables. |
| 32 | I | −DS16 | Data Size 16. The adapter logic drives this signal low to indicate a 16 bit data path. Conversely, a high on this line indicates an 8 bit data path. This signal should be based on a decode of the unlatched addresses if both 8 and 16 bit data paths are to be supported on the same card. |
| 25 | I | −ERROR | Error. The adapter logic drives this signal low to indicate that an error condition has occurred. A low level on −ERROR causes the −CHCK line to be asserted on the MCA Bus. It will go inactive when the card is disabled by writing a 1 to 0 bit of POS register 102 or during channel reset. None of these actions will actually clear the error. The −ERROR line must be raised by the adapter logic. The fact that an error occurred is latched internally and made available as bit 7 set-up register 105. This bit will stay at 0 (indication an error occurred) even after the −ERROR line is raised. It is set by writing a 1 to the same location. Circuitry for the function is not specifically shown in FIGS. 2 to 5. |
| 42 | I | −ADPRDY | Adapter Ready. An active low signal from the adapter logic indicating that the addressed portion of the adapter is slow and will require the cycle to be extended. This signal should be based on an un-latched decode of the address information. A low condition causes the circuit to lower the CD CHRDY line on the MCA bus. It is removed by −RDYSTB for asynchronous extended cycles and by the leading edge of −CMD for synchronous extended cycles. |
| 43 | I | −RDYSTB | Ready Strobe. The adapter logic causes a rising a edge on this line to tell the circuit that it is ready to complete the cycle. In response to this edge, the circuit will raise the CD CHRDY line on the MCA bus. |
| 38 | O | CDEN | Card Enabled. This signal reflects the state of bit 0 in POS register 102. When high it indicates to the adapter logic that the card has been enabled for normal operation. According to the MCA specification, all outputs to the MCA bus (except those necessary for POS operation) should be de-gated when this signal is low. The circuit does this for all its applicable lines that are tied directly to the MCA bus. This line will be set low following a CHRESET. |
| 39 | O | POS102B6 | |
| 40 | O | POS102B7 | POS Register 102 Bits 6 and 7. These lines reflect the state of POS register 102 bits 6 and 7. They are available for general purpose use by the adapter logic. They are reset to 0 by CHRESET. |
| 63 | O | −101RD | |
| 62 | O | −100RD | POS Register 100 and 101 Read. These signals are active low read strobes corresponding to POS registers that return the 16 bit CARD ID. These registers do not exist in the circuit, so these lines must be used to gate external ID information onto the data bus. −100RD corresponds to the low byte and −101RD is the high byte. |
| 36 | O | −BUFENL | Buffer Enable Low Byte. This output is used to enable an external transceiver which isolates the low order data lines from the adapter logic (and the circuit) from the MCA bus data bus pins. |
| 34 | O | −BUFENH | Buffer Enable High Byte. This output is used to enable an external transceiver which isolates the high order data lines from the adapter logic (and the circuit) from the MCA bus data bus pins. The high byte transceiver is only enabled when the adapter logic has indicated (via −DS16) that a 16-bit data area has been addressed. |
| 37 | O | BUFDIR | Buffer Direction. This output controls the direction of the external data bus transceivers. A high on this pin indicates that a write cycle is being performed on the MCA bus and the data transceivers should allow data to flow onto the adapter card. |
| 56 | B | D7 | |
| 55 | B | D6 | |
| 54 | B | D5 | |
| 53 | B | D4 | |
| 51 | B | D3 | |
| 50 | B | D2 | |
| 49 | B | D1 | |
| 48 | B | D0 | Data Bus Bits 7 through 0. This is the bidirectional data bus used to communicate data to and from the circuit. They must be isolated from the MCA bus with a transceiver, which would normally be the same transceiver used to isolate the low order data bus on the rest of the adapter logic. |

Multi-Function Pins: The multi-function pins (MFP0:9) are a group of 10 pins whose function are changed by a strapping option. For the most part, the function of these pins is related to POS support. Depending on the mode, varying amounts of relocation support are provided.

| | | | |
|---|---|---|---|
| 11 | O | PIN-MODE | Pinmode. This pin is tied one of three ways to determine which mode the multi-function pins are in. If this input is tied to Vss, pin mode 0 will be selected. If tied to Vdd, pin mode 1 will be selected. If tied to CHRESET, pin mode 2 will be selected. Note that the state of this pin is sampled at power-up and CHRESET and is not intended to be changed "on-the-fly". Errors in the operation of the circuit will result. |
| 23 | O | MFP9 | |
| 22 | O | MFP8 | |
| 21 | O | MFP7 | |
| 20 | O | MFP6 | |
| 19 | O | MFP5 | |
| 17 | O | MFP4 | |
| 16 | O | MFP3 | |
| 15 | O | MFP2 | |
| 14 | O | MFP1 | |
| 13 | O | MFP0 | Multi-function Pins 0-9. The function of the pins in the various pin modes is described above under pin mode 0, etc. |

The following pins supply power to the circuit:
18,52 Vdd Power Supply.
1,35 Vss Ground Logical circuits for implementing the functions of the present invention are shown in FIGS. 2, 3, 4 and 5. These circuits 2 are merely one example as to how the previously explained set of functions can be logically implemented. The detailed logic 4 (as contrasted to the functions performed) is not particularly important to the present invention; however, it is shown in the interest of completeness. The novelty in the present invention is directed to the combination of functions, how they have been partitioned and implemented, and the new signals that have been provided.

The logical circuit diagrams in FIGS. 2, 3, 4 and 5 will now be explained.

FIG. 2 shows logic to implement the Bus Arbitration Control 11c. The circuit consists of five interconnected logic circuits 203, 204, 205, 206 and 207. Circuit 205 accepts the four bit signal on line 205A which describe the arbitration level of the bus and it generates the MCA coded arbitration signals. The circuit in effect tries to put the name of the circuit on the MCA bus. The signals 105Q0 to 105Q3 originate in the circuit 406 shown in FIG. 4 and hereinafter described. It is noted that the lines ARB0 to ARB3 both go into and out of the circuit indicating that the circuit keeps trying to put the signal on the MCA bus until the operation is successful.

Circuit 203 accepts the signals that represent a local request for service and this circuit generates MCA arbitration request signal until circuit 204 indicates that the request has been serviced and that it is complete. Circuit 204 accepts the local request for service signals and the BUSGRANT signal indicating that the request has won approval and it genrates the DACK signal.

Circuit 206 accepts the signals indicating that the bus has been "won" together with several other signals and it determines when the bus must be relinquished. Circuit 207 accepts the BURST MODE signal and it determines whether or not to pass a BURST signal to the MCA bus.

The circuit in FIG. 3 is logic that changes the function of the multifunction pins. There are five comparators 301 to 305 and a multiplexer 306. The comparators 301 to 305 in effect compare actual addresses to a stored address. Which signals are gated to the output of multiplexer 306 is determined by the Pin Mode (PMODE) selected by circuit 401.

FIG. 4 shows the implementation of the POS registers and the POS register control. Circuit 406 is the actual register storage. Multiplexer 405 determines which register is selected for Readback. Circuit 401 sets the pin mode. The circuit obtains three modes from one pin by looking at the PINMODE signal before and after the RESET signal. If a change is detected, this is taken as an indication of the third Pin mode.

Circuit 402 saves the status and set up signals from the MCA bus when the ADL signal is activated. Circuit 403 takes the low order bits and latches the information when the circuit is in set-up mode. It decodes the three input line into a one out of eight code. Circuit 407 takes the latched commands and generates the traditional peripheral control signals.

The circuit shown in FIG. 5 allows the peripheral device to extend the cycle on the MCA bus in either of two ways. Circuit 501 combines the signals shown to generate the CD Ready signal. Circuit 502 accepts the signal that describe the data size that the peripheral device wants to transfer, and it holds the signal to the MCA bus if the circuit is in set up mode or if the card is not enabled. Latch 504 stores information to indicate that the high order data buffers are to be enabled. Circuit 503 blocks the CDSEL signal from being generated as the MCA bus CD SFDBK signal if the circuit is in Setup mode, if the card is not enabled, or if a DMA transfer is in progress. Circuit 506 combines the internal command signals and generates the BUFENL, BUFENH and BUFDIR signal.

While a particular embodiment of the invention has been shown and claimed, it should be clearly understood that the invention is not limited to the specific embodiment shown herein. Many modifications may be made without departing from the spirit and scope of the invention. The description of a specific embodiment is not meant to limit the scope of the invention. It is contemplated and specifically stated that the applicants inventions covers all modifications and alternatives to the specific embodiment shown which may fall within the words and spirit of the appended claims. It is to be fully understood that all of the foregoing is intended to be merely illustrative and is not to be construed or interpreted as being restrictive or otherwise limiting of the present invention.

I claim:

1. An integrated circuit for use in connecting a peripheral device to a microchannel bus, said microchannel bus including command and status lines, a channel reset line, bus arbitration control lines, including a preempt line, a arbitrate/grant line and four arbitration bus priority level (ARB) lines, address lines, data lines, a refresh line, and a channel ready line, said integrated circuit comprising:

command decode means, coupled to said command and status lines, for generating memory read, memory write, I/O read and I/O write output signals;

a plurality of programmable option select (POS) registers;

register control logic means, coupled to a plurality of said command and status lines, for generating read and write signals for said POS registers;

a plurality of multifunction pins;

a plurality of comparators having first inputs coupled to selected ones of said POS registers, second inputs coupled to a group of pins of a first portion of said multifunction pins, and outputs coupled to a second portion of said multifunction pins; and pin mode control means, responsive to a pin mode input, for coupling said first portion of said multifunction pins to said second comparator inputs and coupling said comparator outputs to said second portion of multifunction pins in a first mode, for providing a first number of said POS register read and write signals to a first number of said multifunction pins in place of a first member of said comparator outputs in a second mode, and for providing a second number, greater than said first number, of said POS register read and write signals to said multifunction pins in a third mode.

2. An integrated circuit for use in connecting a peripheral device to a microchannel bus, said microchannel bus including command and status lines, a channel reset line, bus arbitration control lines, including a preempt line, a arbitrate/grant line and four arbitration bus priority level (ARB) lines, address lines, data lines, a refresh line, and a channel ready line, said integrated circuit comprising:

command decode means, coupled to said command and status lines, for generating memory read, memory write, I/O read and I/O write output signals;

a priority level register for storing a priority level of said peripheral device;

bus arbitration control means, coupled to said bus arbitration control lines, for comparing bits on said ARB lines to said priority level in response to a signal on said arbitrate/grant line, for providing a signal on said preempt line in response to a DREQ signal from said peripheral device, for providing a DACK signal to said peripheral device if said priority level has a priority equal to said ARB bits to give said peripheral device control of said microchannel bus, and for generating a SUSPEND output signal when said peripheral device has control of said microchannel bus and a signal is detected on said preempt line from another device coupled to said microchannel bus;

a plurality of programmable option select (POS) registers;

register control logic means, coupled to a plurality of said command and status lines, for generating read and write signal for said POS registers;

a plurality of multifunction pins;

a plurality of comparators having first inputs coupled to selected ones of said POS registers, second inputs coupled to a group of pins of a first portion of said multifunction pins, and outputs coupled to a second portion of said multifunction pins; and pin mode control means, responsive to a pin mode input, for coupling said first portion of said multifunction pins to said second comparator inputs and coupling said comparator outputs to said second portion of multifunction pins in a first mode, for providing a first number of said POS register read and write signals to a first number of said multifunction pins in place of a first number of said comparator outputs in a second mode, and for providing a second number, greater than said first number, of said POS register read and write signals to said multifunction pins in a third mode.

3. The integrated circuit of claim 1 or 2 wherein said pin mode input is tied to one of a fixed low level and a fixed high level for said first and second modes and is tied to said channel reset line for said third mode.

4. The integrated circuit of claim 1 or 2 wherein said pin mode control means includes a multiplexer having inputs coupled to a portion of said POS register read and write lines and a portion of said comparator outputs, said multiplexer having outputs coupled to a portion of said multifunction pins and further comprising pin mode logic coupling said pin mode input to a select input of said multiplexer.

5. The integrated circuit of claim 4 further comprising a tri-state buffer coupling a portion of said POS register read and write lines to a portion of said multifunction pins, said tri-state buffer having an enable input coupled to an output of said pin mode logic.

* * * * *